March 10, 1931.  R. DIETZE  1,796,245
ELECTRICAL REGULATING SYSTEM
Filed March 21, 1930
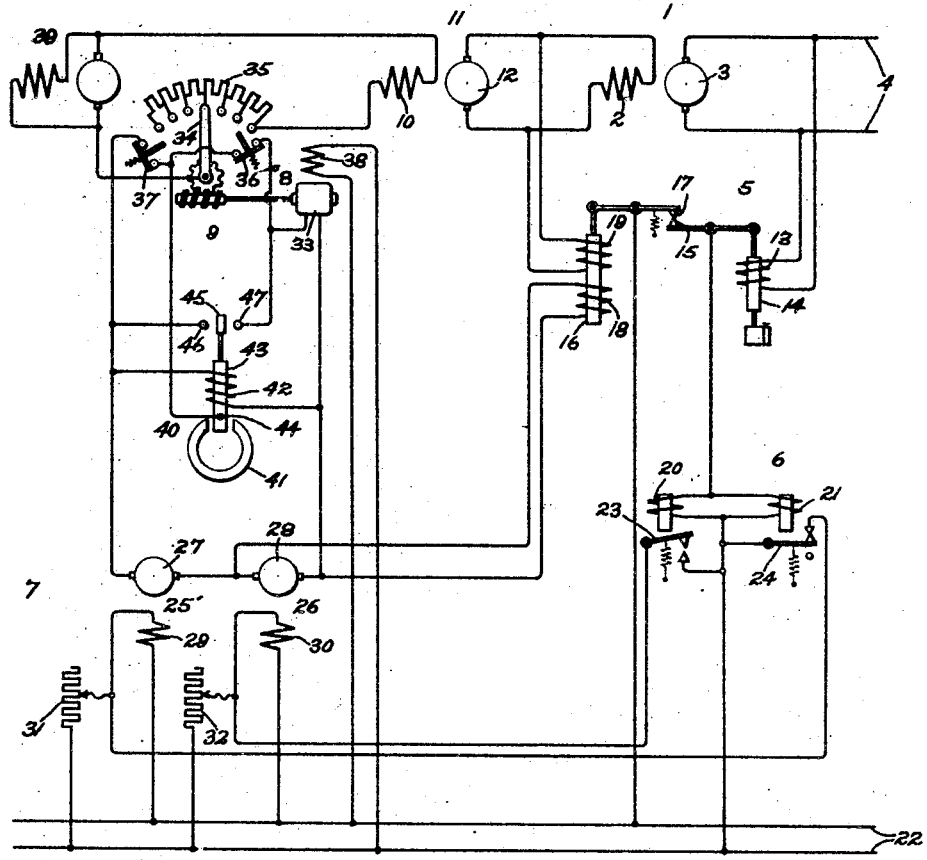
Inventor:
Richard Dietze,
by Charles E. Tullar
His Attorney.

Patented Mar. 10, 1931

1,796,245

UNITED STATES PATENT OFFICE

RICHARD DIETZE, OF BERLIN-PANKOW, GERMANY, ASSIGNOR TO GENERAL ELECTRIC COMPANY, A CORPORATION OF NEW YORK

ELECTRICAL REGULATING SYSTEM

Application filed March 21, 1930, Serial No. 437,853, and in Germany April 13, 1929.

My invention relates to electrical regulators and particularly to regulating systems for large dynamo electric machines.

In the regulation of an electrical condition of large dynamo electric machines through field current control, the exciter field currents are often of such magnitude that the ordinary quick acting regulators, whether of the vibratory contact type or the resistance type, cannot always control them in a satisfactory manner. While these currents may be reduced to values which the quick acting regulators can control, by the use of one or more sub-exciters upon whose field circuits the regulators act, this practice is open to the disadvantage that each additional exciter adds its inherent time of operation to that of the others with the result that rapid regulation is impossible. Motor-operated resistance regulators, while capable of controlling higher current values than can the ordinary quick acting regulators, are usually too slow in operation to be satisfactory when controlled by the conventional operating means. I propose to use a regulating system which embodies the current-controlling ability of the motor-operated resistance regulator without sacrificing the speed of operation of the vibratory contact type regulator.

It is an object of my invention to provide a new and improved quick-acting regulating system which is capable of controlling relatively high current values.

My invention will be better understood from the following description taken in connection with the accompanying drawing, and its scope will be pointed out in the appended claims.

Referring to the single figure of the accompanying drawing, which is a diagrammatic illustration of a preferred embodiment of my invention, 1 is a large dynamo electric machine having a field winding 2 and an armature 3 connected to supply power to a circuit 4, one of whose electrical conditions, in this case line voltage, is to be regulated. Connected so as to be responsive to the line voltage of circuit 4 is a quick-acting regulator 5 of the Tirrill type, which controls the operation of a special relay 6. Relay 6 in turn controls the voltage of a generator set 7 which supplies current to the operating motor 8 of a motor-operated resistance regulator 9 which is in the circuit with the field winding 10 of an exciter 11 whose armature 12 is connected across the field winding 2 of the main machine 1.

Regulator 5 comprises a main operating coil 13, connected across line 4, whose armature 14 is connected by the conventional means to the main control contact 15. Armature 16 is connected by the conventional means to vibratory contact 17 and has two operating coils 18 and 19, the former being the conventional anti-hunting coil which is connected across one of the generators of generator set 7, while the latter is provided for the purpose of giving stability of operation to the system, and is connected across exciter 11.

Relay 6 has a pair of operating coils 20 and 21 which are connected in parallel with respect to each other and in series with respect to contacts 15, 17, and a current supply bus 22. Coils 20 and 21 have associated therewith respectively relay armatures 23 and 24, each of which carries a movable contact adapted to cooperate with a fixed contact. These contacts are so arranged that when coils 20 and 21 are energized the contacts under the control of coil 20 are separated, while those under the control of coil 21 are engaged and vice versa.

Generator set 7 comprises a pair of separately excited generators 25 and 26, whose respective armatures 27 and 28 are connected in series and whose respective field windings 29 and 30 are each connected across bus 22 in series with a variable resistance 31 and 32 respectively. The contacts under the control of coils 20 and 21 respectively of relay 6 are connected so as to be capable of short-circuiting the working portions of resistances 32 and 31 respectively. Machines 25 and 26 are so connected that their terminal voltages are in opposition.

Motor-operated resistance regulator 9 comprises a separately excited motor 8, whose armature 33 is mechanically coupled by suitable mechanism to movable arm 34, which is adapted to move over taps connected to resistance 35 which is in series with field winding 10 of exciter 11. Armature 33 is electrically connected across the series connected armatures 27 and 28 of generators 25 and 26 in series with a pair of limit switches 36 and 37, which are associated with arm 34. Field winding 38 of motor 8 is connected across bus 22. Any suitable source of current, shown as a generator 39, is provided for energizing the field winding 10 of exciter 12.

Polarized relay 40 is provided for the purpose of short-circuiting whichever limit switch happens to be open when the polarity of the generator set 7 is such that the motor 8 would tend to operate in a direction to cause arm 34 to close the particular limit switch. This relay comprises a permanent magnet 41, an operating coil 42, which is mounted on an armature 43 which is pivoted at 44. Coil 42 is connected across series connected armatures 27 and 28. Armature 43, which carries a contact 45, movable between fixed contacts 46 and 47, is connected to one each of the contacts of limit switches 36 and 37. Fixed contacts 47 and 46 are connected to the remaining contacts of limit switches 36 and 37 respectively.

The operation of the illustrated embodiment of my invention is as follows: Assume that machines 1, 11, 25, 26, and 39 are being driven at their rated speeds, that bus 22 is connected to a suitable source of current supply and that circuit 4 is carrying its normal load current at the desired voltage. Under these circumstances, generator 1 must necessarily be operating with proper excitation from which it follows that exciter 11 must also be operating with proper excitation. As a result rheostat arm 34 should be stationary and this condition exists when the voltage across operating motor 8 is zero, which is only possible when the terminal voltages of machines 25 and 26 are equal, it being understood that the machines are connected so that their voltages are in opposition. In order to accomplish this, field windings 29 and 30 should each carry the proper average current, which if the machines 25 and 26 are similar, as they are shown, would be the same for each winding. Thus, if resistances 31 and 32 are similarly adjusted, and they are so shown, the contacts under the control of relay coils 20 and 21 respectively must have an equal time open to time closed in order to maintain an equal average current in each of the field windings 29 and 30. This in turn requires that main contacts 15 and 17 of regulator 5 also have an equal ratio of time open to time closed and this is accomplished through the action of coil 18 which corresponds to the anti-hunting coil on the ordinary Tirrill type regulator whose mode of operation is well known to those skilled in the art. Should a change in external conditions cause a variation in voltage on circuit 4, contact 15 will move, due to the change in pull of coil 13. This will cause a variation in the ratio of time open to time closed of contacts 15 and 17, causing through the operation of relay 6, the voltage of machines 25 and 26 to vary in such a way that their combined voltage will be greater than zero and will be of such polarity as to cause motor 8 to move arm 34 in the proper direction to produce a compensating change in the field current of exciter 10 and hence in the voltage of machine 1. As soon as the voltage of circuit 4 returns to normal, contact 15 will stop moving, just as in the ordinary Tirrill type regulator. As will be seen from a consideration of the operation of the system, the changes in the effects produced by coils 18 and 19 on core 16, when movement of contact 15 tends to disturb the equal ratio of time open to time closed of contacts 15 and 17, will be opposite. Thus, for example, if contact 15 rises, due to a decrease in voltage on circuit 4, the ratio of time closed to time open of contacts 15 and 17 will be increased, thereby causing the ratio of time open to time closed of the contacts under the control of coil 20 to increase and thereby decrease the average field current of machine 26, and hence its terminal voltage, thereby decreasing the current through coil 18. Coil 19, on the other hand, will have its current increased upon a decrease in voltage on line 4, for the result of the action of the regulating system in restoring the voltage will be to increase the voltage of exciter 12 and hence the voltage across coil 19. Coils 18 and 19 are so arranged that upon the return of the voltage of line 4 to normal, which will be accompanied by the cessation of movement of main control contact 15 as in any quick-acting regulator of the Tirrill type, their combined effect upon core 16 will be such that the vibratory action of contact 17 will result in an equal time-open time-closed ratio of contacts 15 and 17. Such a ratio, as heretofore described, causes an equalization of the voltages of machines 25 and 26, thereby stopping motor 8.

While I have shown my regulating system as regulating voltage it will, of course, be obvious to those skilled in the art that it might equally well be used to regulate any of the electrical conditions of electrical apparatus or circuits which the ordinary regulator of the Tirrill type has heretofore been employed to regulate. It will also be apparent that coil 19 might equally well be made responsive to the current through exciter 12. Also by adjusting the values of resistances 31 and 32 it will be apparent that some other ratio than that of equal time-open time-closed of contacts 15 and 17 could be employed to hold a zero net voltage on motor 8.

The use of two generators connected in opposition, both of whose field resistances are periodically short circuited, has the advantage that it gives a very rapid rate of change of voltage on motor 8 and hence a quicker action than other arrangements. In other words, it results in what might be called a double differential action as distinguished from the mere differential action which takes place when but one of two machines in opposition has its field resistance periodically short circuited.

Relay 40 is provided for the purpose of allowing motor 8 to return arm 34 to an intermediate position after it has opened one of the limit switches. Thus, for example, if limit switch 37 is open, relay 40 is so connected that only when the net voltage of machines 25 and 26 is of such polarity that it would cause motor 8 to return arm 34 to an intermediate position will contact 45 engage contact 46 and thereby short circuit switch 37 and allow motor 8 to operate. This relay need not be permanently connected across the circuit as shown, but its circuit may be so arranged that only upon the operation of one or the other of the limit switches will it be completed.

While I have shown and described a particular embodiment of my invention it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In an electrical regulating system, a regulator, operating means for said regulator whose operation is responsive to the voltage impressed thereon, a pair of generators whose voltages are in opposition connected in series with said operating means for said regulator, a second regulator, and means under the control of said second regulator for oppositely varying the voltages of said generators.

2. In an electrical regulating system, in combination, a motor operated resistance regulator, a pair of generators connected in opposition across the operating motor of said regulator, a vibratory contact regulator, and means responsive to the action of said vibratory contact regulator for oppositely varying the field excitations of said generators.

3. In an electrical regulating system, in combination, a relatively slow acting heavy current carrying regulator comprising a resistance, electrical operating means for varying the magnitude of said resistance, the speed of operation of said operating means being proportional to the voltage applied to it while the direction of operation of said operating means is dependent upon the polarity of the voltage applied to it, a pair of generators connected in opposition across said operating means, a relatively quick acting small current carrying regulator and means responsive to the action of said quick acting regulator for oppositely varying the voltage of said generators.

4. In combination, an electric circuit, a dynamo electric machine for supplying electrical energy to said circuit, means for regulating an electrical condition of said circuit, said means including voltage responsive means for varying the excitation of said dynamo electric machine, a pair of generators whose terminal voltages oppose each other connected in series to said excitation varying means, a vibratory contact type regulator connected to be responsive to variations in said electrical condition of said circuit, and means under the control of said vibratory contact regulator for oppositely varying the excitation of said generators in response to variations in said electrical condition.

5. In combination, an electric circuit, a dynamo electric machine connected to supply electrical energy to said circuit, an exciter for said dynamo electric machine, means for regulating an electrical condition of said circuit, said means comprising a resistance type regulator including an electrical operating means therefor, a pair of generators connected in series with said operating means, the voltage of said generators being in opposition but normally equal in magnitude, a vibratory contact type regulator connected to said circuit so as to be responsive to variations in said electrical conditions, means under the control of said vibratory contact regulator for varying the voltages of said generators both oppositely with respect to each other and one oppositely with respect to the direction of change of said electrical condition, said vibratory contact regulator having a two-element means for controlling the position of its vibratory contact, one of said means being connected to be responsive to the degree of excitation of said dynamo electric machine, the other element being connected to be responsive to the voltage of the generator whose voltage varies oppositely to the variation in degree of excitation of said dynamo electric machine.

6. In combination, an electric circuit, a dynamo electric machine for supplying electrical energy to said circuit, means including an electric motor for varying the excitation of said dynamo electric machine in response to variations in voltage applied to said motor, means for varying said voltage comprising a pair of generators connected in series opposition to said motor, a resistance in series with the field winding of each of said generators, a vibratory contact type regulator connected to be responsive to variations in the voltage of said circuit, a relay connected across the contacts of said vibratory contact regulator, said relay including two pairs of vibratory contacts, said pairs of contacts being so arranged that their ratios of time-open to time-closed vary oppositely with variation in said ratio of the contacts of said vibratory contact regulator, means connecting each one of said pairs of contacts across a different one of said field resistances, and a source of current for said field windings and the circuit including the contacts of said vibratory control regulator.

7. In a regulating system, in combination, a reversible motor operated resistance regulator, a pair of limit switches associated with said regulator, a series circuit including said motor, said limit switches and a source of current supply, a vibratory contact regulator, means under the control of said vibratory contact regulator for varying the magnitude and polarity of the voltage of said source, and means connected across said source for short circuiting any open limit switch when the polarity of said voltage source is such that when said switch is short circuited said motor will tend to close said switch.

In witness whereof I have hereunto set my hand this 20th day of February, 1930.

RICHARD DIETZE.